(12) United States Patent
Cunha

(10) Patent No.: US 7,722,325 B2
(45) Date of Patent: May 25, 2010

(54) REFRACTORY METAL CORE MAIN BODY TRENCH

(75) Inventor: Francisco J. Cunha, Avon, CT (US)

(73) Assignee: United Technologies Corporation, Hartford, CT (US)

( * ) Notice: Subject to any disclaimer, the term of this patent is extended or adjusted under 35 U.S.C. 154(b) by 690 days.

(21) Appl. No.: 11/594,263

(22) Filed: Nov. 8, 2006

(65) Prior Publication Data
US 2008/0107541 A1 May 8, 2008

(51) Int. Cl.
*F01D 5/18* (2006.01)
(52) U.S. Cl. .................................... 416/97 R; 415/115
(58) Field of Classification Search ............... 416/96 R, 416/97 R; 415/115
See application file for complete search history.

(56) References Cited

U.S. PATENT DOCUMENTS

| 5,403,159 | A | * | 4/1995 | Green et al. ............. 416/97 R |
| 5,419,039 | A | * | 5/1995 | Auxier et al. ........... 29/889.721 |
| 5,649,806 | A | * | 7/1997 | Scricca et al. ............... 415/115 |
| 6,234,755 | B1 | | 5/2001 | Bunker |
| 6,254,334 | B1 | * | 7/2001 | LaFleur ..................... 415/115 |
| 7,478,994 | B2 | * | 1/2009 | Cunha et al. ............. 416/97 R |

OTHER PUBLICATIONS

High Resolution Film Cooling Effectiveness Measurements of Axial Holes . . . , Proceedings of GT2006 ASME Turbo Expo 2006: Power for Land, Sea and Air, 5/8-11, Spain.

* cited by examiner

*Primary Examiner*—Ninh H Nguyen
(74) *Attorney, Agent, or Firm*—Carlson, Gaskey & Olds, PC

(57) ABSTRACT

An article, such as a gas turbine engine turbine blade, includes a film cooling system having a trench recessed within a wall of the component, a passage that opens into the trench for discharging a coolant flow into the trench, and a guide member within the trench for influencing the coolant flow discharge from the passage.

22 Claims, 3 Drawing Sheets

FIG.3

FIG.4 ents that accompany the detailed description can be
REFRACTORY METAL CORE MAIN BODY TRENCH

BACKGROUND OF THE INVENTION

This invention relates to cooling a component that is used in an elevated temperature environment and, more particularly, to an article and method for increasing effectiveness of cooling the component.

A variety of different machines, such as gas turbine engines, typically include components that operate under elevated temperatures. To resist the elevated temperatures, the components traditionally employ a cooling system. For example, gas turbine engines utilize turbine blades having a film cooling system. Typical film cooling systems include passages within walls of the turbine blade that carry relatively cool air taken from an air flow through the engine. The passages open to outer surfaces of the turbine blade and discharge the cool air as a film over the surfaces to maintain the blade below a certain temperature.

Typical film cooling systems have the problem that the discharged film mixes with a hot gas flow over the surfaces to thereby reduce cooling effectiveness. One solution is to increase the discharge flow of the air from the passages, however, this requires an increase in air taken from the air flow through the engine, which reduces efficiency of the engine.

Another solution includes utilizing a trench formed in a coating that is on the outer surface of the turbine blade and discharging the air into the trench. The trench provides shelter from the hot gas flow such that the discharged air can remain in contact with the walls of the turbine blade to provide cooling. Although effective, once the cool air flows out of the trench, it mixes with the hot gas flow and the cooling effectiveness decreases as a function of distance from the trench. Again, increasing the discharge flow of the air would provide more effective cooling over a longer distance, but at the cost of reducing engine efficiency.

Therefore, what is a needed is an arrangement and method for providing enhanced cooling without having to increase the flow of the cooling air. This invention addresses these needs while avoiding the shortcomings and drawbacks of the prior art.

SUMMARY OF THE INVENTION

An example article having a film cooling system includes a component wall having a trench recessed therein, a passage that opens into the trench for discharging a coolant flow into the trench and a guide member within the trench for influencing the coolant flow discharged from the passage. In one example, the guide member has a teardrop cross-sectional shape that directs the coolant flow in a predetermined direction to enhance cooling effectiveness. In one example, the article is a turbine blade within a gas turbine engine.

An example method of film cooling for use in a gas turbine engine includes the steps of discharging the coolant flow from the passage and influencing the coolant flow to flow in a predetermined direction from the passage using the guide member. Optionally, the guide members have a particular orientation relative to an engine centerline axis to reduce aerodynamic losses as the coolant flow flows from the trench over outer surfaces of the turbine blade.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
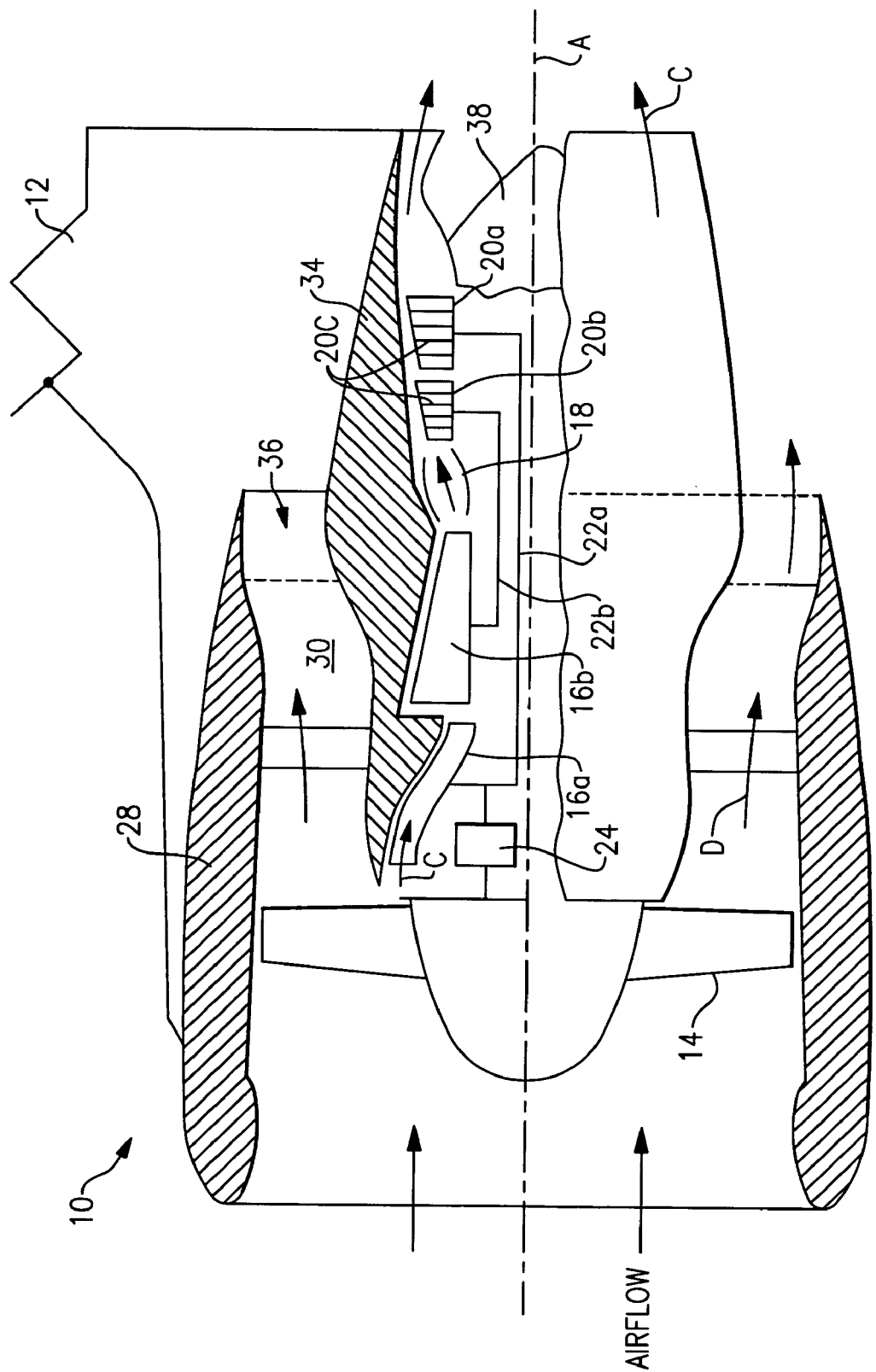
FIG. 1 illustrates selected portions of an example gas turbine engine.

FIG. 1 illustrates a schematic view of selected portions of an example gas turbine engine 10 suspended from an engine pylon 12 of an aircraft. The gas turbine engine 10 is circumferentially disposed about an engine center line axis A and includes a fan 14, a low pressure compressor 16a, a high pressure compressor 16b, a combustion section 18, a low pressure turbine 20a, and a high pressure turbine 20b. As is known, pressurized air from the compressors 16a, 16b and is mixed with fuel and burned in the combustion section 18 for expansion in the turbines 20a, 20b. The turbines 20a, 20b are coupled for rotation with, respectively, rotors 22a and 22b (e.g., spools) to rotationally drive the compressors 16a, 16b and the fan 14 in response to the expansion of gases over turbine blades 20c of the turbines 20a and 20b. In this example, the rotor 22a drives the fan 14 through a gear 24, such as a planetary gear arrangement or other gear system.

An outer housing, nacelle 28 (also commonly referred to as a fan nacelle), extends circumferentially about the fan 14. A generally annular fan bypass passage 30 extends between the nacelle 28 and an inner housing, inner cowl 34, which generally surrounds the compressors 16a, 16b and turbines 20a, 20b. Although this example shows a specific engine arrangement, it is to be understood that other types of engines or engine arrangements are contemplated.

In operation, the fan 14 draws air into the gas turbine engine 10 as a core flow C and into the bypass passage 30 as a bypass airflow D. An exhaust 36 discharges the bypass airflow D from the gas turbine engine 10 to provide thrust. The core flow C is discharged from a passage between inner cowl 34 and a tail cone 38.

Figure 2:
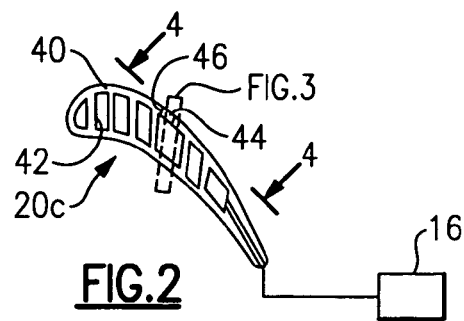
FIG. 2 illustrates a cross-section of an example turbine blade within the gas turbine engine of FIG. 1.

FIG. 2 illustrates one example of a cross-section of the turbine blade 20c. In this example, the turbine blade 20c includes walls 40 that generally form an airfoil shape of the turbine blade 20c. In one example, a refractory metal core manufacturing process is used to form the walls 40 in the desired shape such that the turbine blade 20c is formed with one or more internal cavities 42, one or more trenches 44 (shown schematically) recessed in the walls 40, and passages 46 (shown schematically) that fluidly connect the internal cavities 42 with the trench 44.

The internal cavities 42, trench 44, and passages 46 cooperate to maintain the turbine blade 20c below a certain temperature. In one example, a coolant flow F (e.g., relatively cool air taken from the compressors 16a, 16b) is fed through the internal cavities 42 and passages 46. The coolant flow F travels through the passages 46 into the trench 44 and over outer surfaces of the walls 40 to maintain the turbine blade 20c below a certain temperature.

Figure 3:
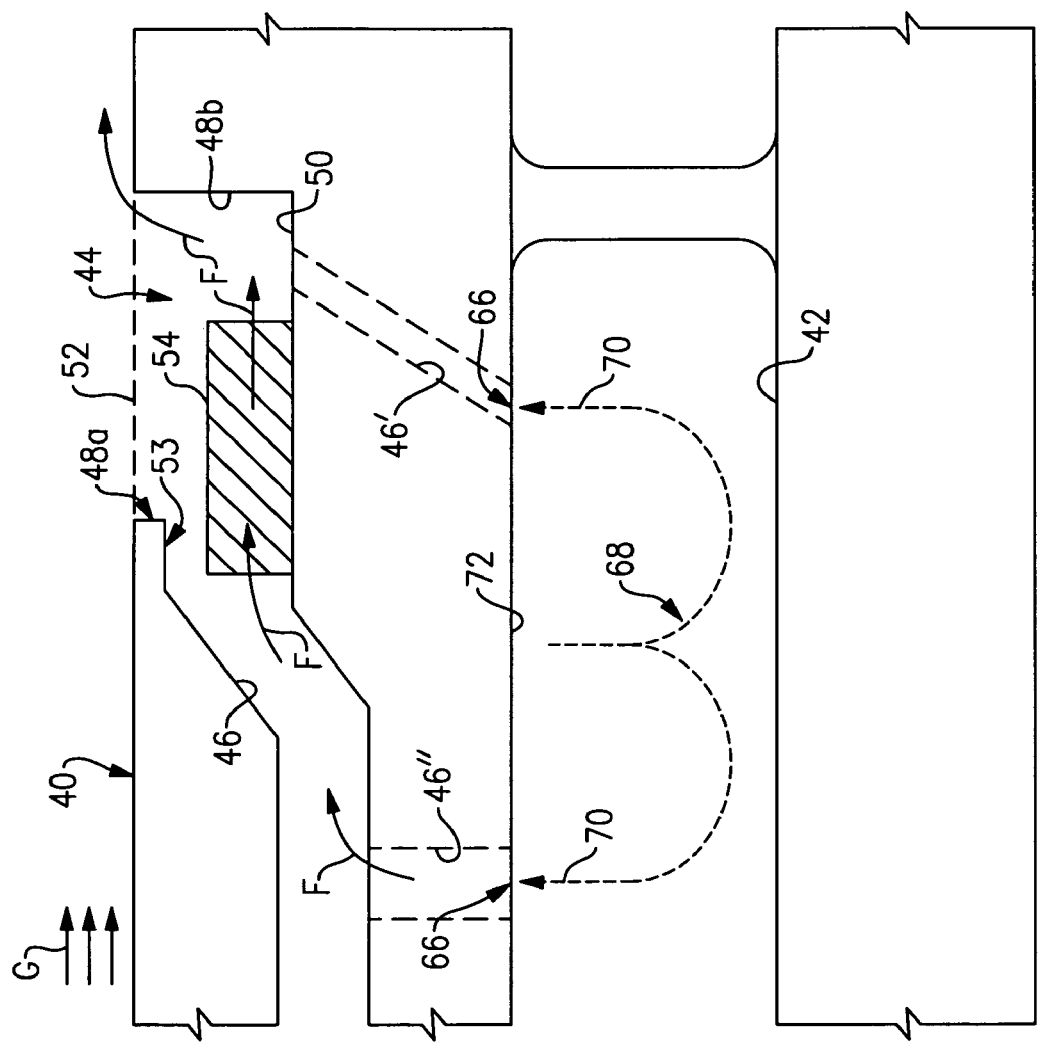
FIG. 3 illustrates a selected portion of a wall of the turbine blade according to the section shown in FIG. 2.

FIG. 3 shows one example arrangement of the internal cavity 42, passage 46, and trench 44. In this example, the wall 40 defines the trench 44 and includes opposed side walls 48a and 48b, a bottom wall 50, and an open side 52 (represented by a dotted line) opposite from the bottom wall 50. Side wall 48a is a leading wall and side wall 48b is a trailing wall relative to a hot gas flow G over the turbine blade 20c (e.g., from the combustion section 18). The passage 46 extends transversely though the wall 40 and opens through side wall 48a at an exit 53 into the trench 44. In this example, the exit 53 is near side wall 48a, however, in other examples, the exit opens through the bottom wall 50 or other side wall 48b, depending on the particular design of the turbine blade 20c. As can also be appreciated from FIGS. 3 and 4, the passage 46 is a non-circular slot in this example and extends substantially along a length of the trench 44. Although a particular configuration is shown in the disclosed examples, it is to be understood that alternative configurations of the internal cavity 42, passage 46 and trench 44 are contemplated.

The trench 44 includes a guide member 54 for influencing the coolant flow F discharged from the passage 46. In the disclosed example, the guide member 54 is integrally formed with the wall 40 and protrudes from the bottom wall 50 of the trench 44. In another example, the guide member 54 may be a separate piece that is then secured in a known manner to the wall 40. In another example, the guide member extends from side wall 48a or side wall 48b.

Figure 4:
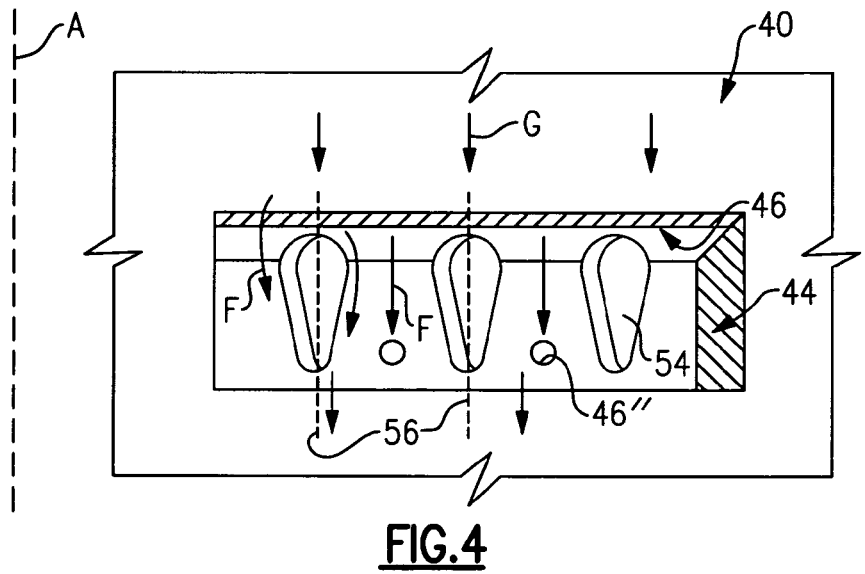
FIG. 4 illustrates a surface view of a trench according to the section shown in FIG. 2.
Figure 5:
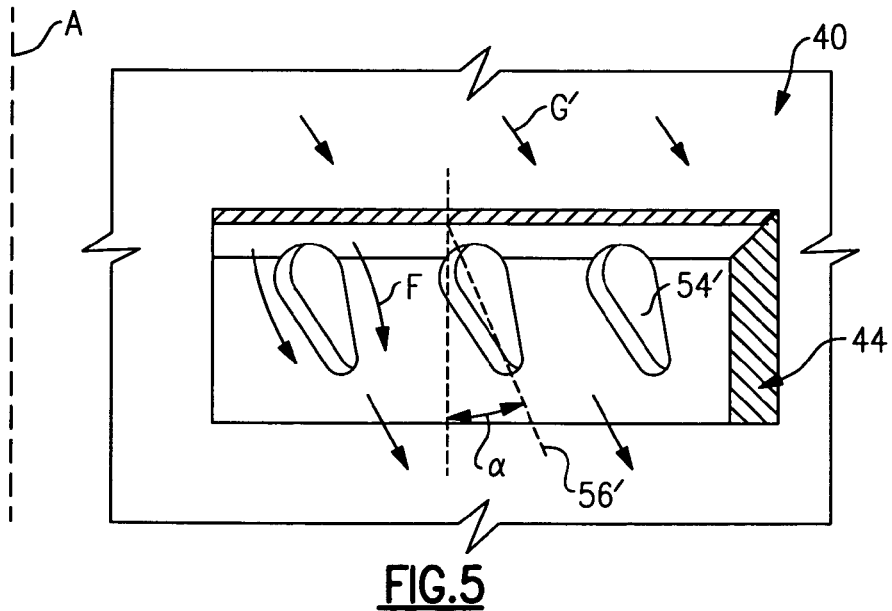
FIG. 5 illustrates a surface view of an alternate embodiment wherein guide members are oriented transversely to an engine centerline axis.

In the illustrated example, the guide member 54 extends at least partially through the exit 53 and into the passage 46. Although the illustrated example shows a gap between the wall 40 and top of the guide member 54, it is to be understood that the guide member 40 can optionally be formed without the gap. In the disclosed example, the guide member 54 has a teardrop cross-sectional shape (FIGS. 4 and 5). Given this description, one of ordinary skill in the art will recognize other cross-sectional shapes that can be used to influence the coolant flow F.

In one example, the walls 40, trench 44, passage 46, and guide members 54 are formed using a refractory metal core process technique. A refractory metal core having posterior legs is used to contact a shell section during casting of a metal or metal alloy used to form the walls 40. The posterior leg corresponds to the shape of the trench 44. The refractory metal core includes negative features adjacent the posterior leg that are in the shape of the teardrop of the guide member 54. In the casting process the negative features become filled with liquid metal and then solidify into the teardrop cross-sectional shape of the guide members 54.

Referring to FIG. 4, each of the guide members 54 includes a longitudinal axis 56. In the illustrated example, the longitudinal axes 56 are each located within a respective imaginary plane (extending out of FIG. 4) that is about parallel with the engine center line axis A. In one example, the term "about" refers to nominal equality within typical manufacturing and design tolerances.

Operationally, the guide members 54 influence the coolant flow F by directing it in a desired direction (i.e., a direction corresponding to the longitudinal axis 56) and blocking it from flowing laterally along the trench 44. The curved surfaces of the teardrop cross-sectional shape of the guide members 54 provide the benefit of minimal turbulence and aerodynamic obstruction to the coolant flow F such that the coolant flows uniformly rather than turbulently. In general, more turbulent flow mixes easier with the hot gas flow G and reduces cooling effectiveness. However, by reducing turbulence and lateral flow using the guide members 54, there is less mixing between the coolant flow F and the hot gas flow G when the coolant flow F leaves the trench 44 and flows over the outer surfaces of the wall 40 as a film. Thus, the cooling flow F is able to cool the walls 40 over a relatively longer distance from the trench 44 compared to more turbulent coolant flow. In one example, cooling effectiveness is determined as a function of a temperature of the coolant flow F inside of the internal cavity 42 and a temperature of the outside of the walls 40 that contacts the coolant flow F.

FIG. 5 illustrates a modified embodiment in which the longitudinal axes 56' are each located within a respective imaginary plane (extending out of FIG. 5) that is oriented at an angle a to the engine center line axis A. The transverse orientation provides the benefit of directing the coolant flow F in a direction that is aligned with an expected direction of the hot gas flow G'. For example, near ends (i.e., tip or base) of the turbine blade 20c, the hot gas flow G' tends to flow in radial directions rather than axially. In the illustrated example, the hot gas flow G' flows radially outwards away from the centerline axis A. If the section shown were close to the base of the turbine blade 20c, the hot gas flow G' would be radially inwards toward the centerline axis A and the longitudinal axes 56' would be likewise oriented.

Aligning the longitudinal axes 56' of guide members 54' that are near the ends with the expected flow direction provides the benefit of reducing aerodynamic losses that would otherwise occur if the coolant flow F was transverse to the hot gas flow G'. In one example, the turbine blade 20c includes a combination of the guide members 54 and 54'. For example, the guide members 54 are located along a center section of the turbine blade 20c and the guide members 54' are located near the radial ends of the turbine blade 20c.

Optionally, as shown in FIG. 3, the wall 40 includes additional passages 46' and 46" each having an entrance 66 positioned at the cavity 42. In this example, the coolant flow F through the cavity 42 circulates in a pattern 68 in response to Coriolis forces that occur because of rotation of the turbine blade 20c about the engine centerline axis A. The pattern 68 can be predicted in a known manner, such as by using a computer simulation, and the location of the entrances 66 then designed to correspond to branches 70 of the pattern 68 that impinge upon inner surface 72 of the cavity 42. Locating the entrances 66 in correspondence with the branches 70 takes advantage of increased coolant flow F due to the Coriolis forces such that the additional passages 46' and 46" act as impingement jets for enhanced coolant flow F into the trench 44. In combination with the guide member 54, 54', the impingement flow through the additional passage 46' and 46" further enhances cooling of the turbine blade 20c.

In one example, guiding the coolant flow F using the guide members 54 is expected to provide a predetermined level of cooling effectiveness over a longer distance from the trench 44 compared to prior arrangements that do not utilize the guide members 54, 54'. As a result, this has positive effects on cycle thermodynamic efficiency, turbine 20a, 20b efficiency, air flow temperature impacts at the inlet of the compressor 16a, 16b and fuel consumption. In one example, the enhanced cooling effectiveness permits a reduction in the cooling flow F for a given thermal load. Additionally, there may be less need to depend on thermal barrier coatings and microcircuit cooling features. Thus, as can be appreciated, the guide members 54, 54' provide more effective cooling without having to take more air from air flow through the gas turbine engine 10, which would otherwise reduce the efficiency of the gas turbine engine 10.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. An article having a film cooling system, comprising:
   a component wall having an inner side, an outer side, and a trench recessed in the outer side;
   a passage extending through the component wall from the inner side and opening into the trench for discharging a coolant flow into the trench; and
   a guide member within the trench for influencing the coolant flow discharged from the passage.

2. The article recited in claim 1, wherein the guide member includes a teardrop cross-sectional shape.

3. The article recited in claim 1, wherein the component wall is formed from a material selected from a metal and a metal alloy.

4. The article recited in claim 1, wherein the guide member and the component wall are integrally formed as a continuous piece.

5. The article recited in claim 1, wherein the guide member and the wall are integrally formed in a refractory metal core process.

6. The article recited in claim 1, wherein the guide member extends at least partially into the passage.

7. The article recited in claim 1, wherein the trench includes two side walls, an open side, and a bottom wall opposite the open side, wherein the guide member protrudes from the bottom wall.

8. The article as recited in claim 7, wherein the open side of the trench is adjacent to the outer side of the component wall.

9. The article recited in claim 1, wherein the passage comprises a non-circular slot.

10. The article recited in claim 9, wherein the non-circular slot extends substantially along a length of the trench.

11. The article as recited in claim 1, wherein the outer side is an exterior surface of gas turbine engine blade.

12. The article as recited in claim 1, wherein the component wall is adjacent to an internal cavity, and at least one additional passage extends between the internal cavity and the trench.

13. The article as recited in claim 1, wherein the trench includes two side walls, an open side, and a bottom wall opposite the open side, wherein the open side is located at the outer side of the component wall.

14. An article having a film cooling system, comprising:
    a component wall having a trench recessed therein;
    a passage extending through the component wall and opening into the trench for discharging a coolant flow into the trench; and
    a guide member within the trench for influencing the coolant flow discharged from the passage, the guide member having a teardrop cross-sectional shape that defines a longitudinal axis that is located within a plane that is transverse to a gas turbine engine centerline axis.

15. A gas turbine engine comprising:
    a compressor;
    a combustor downstream of the compressor;
    a turbine downstream of the combustor, the turbine having a turbine blade comprising:
       a blade wall having an inner side, an outer side, and a trench recessed in the outer side,
       a passage extending through the blade wall from the inner side and opening into the trench for discharging a coolant flow into the trench, and
       a guide member within the trench that influences the coolant flow discharged from the passage.

16. A gas turbine engine comprising:
    a compressor;
    a combustor downstream of the compressor;
    a turbine downstream of the combustor, the turbine having a turbine blade comprising:
       a blade wall having a trench recessed therein,
       a passage extending through the blade wall and opening into the trench for discharging a coolant flow into the trench,
       a guide member within the trench that influences the coolant flow discharged from the passage; and
       a cavity for feeding the coolant flow to the passage and at least one additional passage within the blade wall that is fluidly connected with the trench.

17. The gas turbine engine as recited in claim 16, wherein the at least one additional passage includes an entrance at the cavity, and wherein a position of the entrance relative to the cavity is based upon an expected coolant flow pattern under an influence of Coriolis forces due to a rotation of the turbine blade.

18. A method of film cooling for use in a gas turbine engine component, comprising:
    (a) discharging a coolant flow from a passage that is within the gas turbine engine component, wherein the passage extends from an inner side of a wall of the gas turbine engine component and opens into a trench recessed in an outer side of the wall of the gas turbine engine component; and
    (b) influencing the coolant flow to flow in a predetermined direction from the passage using a guide member within the trench.

19. The method as recited in claim 18, wherein said step (b) includes directing the coolant flow in a direction that is located within a plane that is about parallel to an engine centerline axis.

20. The method as recited in claim 18, wherein said step (b) includes directing the coolant flow in a direction that is located within a plane that is transverse to an engine centerline axis.

21. The method as recited in claim 18, wherein said step (b) includes forming the guide member with a teardrop cross-sectional shape.

22. The method as recited in claim 18, wherein said step (b) includes forming the guide member with a predetermined orientation such that an axis of the guide member is located within a plane that is transverse to an engine centerline axis.

* * * * *